United States Patent [19]
Dunlop et al.

[11] 3,850,694
[45] Nov. 26, 1974

[54] LOW PRESSURE NICKEL HYDROGEN CELL

[75] Inventors: James D. Dunlop, Gaithersburg; Martin William Earl; Gerrit Van Ommering, both of Adelphi, all of Md.

[73] Assignee: Communications Satellite Corporation, Washington, D.C.

[22] Filed: Nov. 27, 1972

[21] Appl. No.: 309,837

[52] U.S. Cl. .............................. 136/86 A, 136/86 R
[51] Int. Cl. ......................................... H01m 27/26
[58] Field of Search ........ 136/28, 83 R, 86 A, 86 T, 136/86 R

[56] References Cited
UNITED STATES PATENTS

| | | | |
|---|---|---|---|
| 3,098,768 | 7/1963 | Tellerington et al. | 136/86 B |
| 3,108,908 | 10/1963 | Krebs | 136/28 |
| 3,669,744 | 6/1972 | Tsenter et al. | 136/28 |

Primary Examiner—Winston A. Douglas
Assistant Examiner—H. A. Feeley
Attorney, Agent, or Firm—Alan J. Kasper; Martin C. Fliesler; James W. Johnson, Jr.

[57] ABSTRACT

A new sealed rechargeable electric fuel cell of the type using a reoxidizable nickel hydroxide as the positive electrode reactant and hydrogen as the negative electrode reactant. The cell uses a hexagonal nickel — rare earth metal hydride compound for storage of hydrogen gas which causes the cell to be maintained at a low gas pressure during charging and discharging.

7 Claims, 4 Drawing Figures

LOW PRESSURE NICKEL HYDROGEN CELL

BACKGROUND OF THE INVENTION

This invention relates to rechargeable power cells and more particularly to an improved sealed cell in which the positive electrode is a metal hydroxide and an oxidizable and ionizable gas is the anodic agent.

Substantial attention has been devoted to the development of several types of electric power cells which employ a gas as one member and a chemically active solid state material as the other member of the electrochemical couple. One such type is a cell in which the anode is a chemically oxidizable metal and the depolarizer is oxygen, e.g. zinc/air and cadmium/air batteries. A second type utilizes an electrochemically reducible metal hydroxide, e.g. nickel hydroxide, at the cathode and a gas that is oxidizable and ionizable, e.g., hydrogen at the anode. A cell of the latter type is disclosed in U.S. Pat. application Ser. No. 259,524, entitled "Nickel Hydrogen Fuel Cell," by Dunlop et al. filed on June 5, 1972 and assigned to the assignee of this invention. Fuel cells constructed in accordance with the teaching of the Dunlop et al application generally include a positive electrode comprising nickel hydroxide on a conductive support, a negative electrode comprising a catalytic layer such as platinum or palladium on a conductive support and a separator wetted with an electrolyte such as an aqueous KOH solution disposed between the positive and negative electrodes.

Each cell may comprise a single pair but preferably a plurality of pairs of negative and positive electrodes with an electrolyte-wetted matrix or separator between each negative and positive electrode. The electrodes and separators may be disposed in a stacked cylindrical, spiral or other suitable configuration. Whatever the configuration, the assembly of electrodes and separator(s) is disposed in a pressure resistant chamber. The chamber is evacuated and then filled with hydrogen to a selected pressure while the positive electrode is in a discharged state. This allows the cell sufficient hydrogen to provide overdischarge protection. After filling, the cell chamber is hermetically sealed. The cell chamber remains sealed at all times during charging and discharging operations. Cells of this type can be repeatedly charged and discharged without need to add more oxidizable gas to the cell to sustain operation, can operate over a wide range of ambient temperatures, have a relatively high energy density, can be constructed in various configurations, and have inherent overcharge and overdischarge protection.

A disadvantage of this type of cell is that the container and feedthroughs used to fill the cell must be specially designed to withstand the relatively high operating pressure and the wide range of pressures over which the cell operates. Typically, such cells operate over a pressure range of 100 to 500 psia at room temperature.

A further disadvantage of such cells is that because the hydrogen is stored as a gas, extreme care must be taken to avoid explosions caused by hydrogen leakage.

SUMMARY OF THE INVENTION

The present invention overcomes the above disadvantages by storing the hydrogen as a reduced compound rather than as a gas at higher pressures. Some hexagonal intermetallic compounds of the composition $AB_5$ where A represents a rare earth metal and B represents nickel or cobalt are known to absorb and desorb easily large quantities of hydrogen gas under relatively small pressures at room temperature. The hydrogen absorbing properties of these compounds is described in "Reversible Room-Temperature Absorption of Large Quantities of Hydrogen by Intermetallic Compounds" by J. H. N. van Vucht, F. A. Kuijpers and H.C.A.M. Burning; Philips Res. Repts. 25, 133–140, 1970. This invention uses one of the hexagonal nickel-rare earth metal compounds for hydrogen storage. The hydrogen absorbing compound is stored within the hermetically sealed pressure resistant chamber of the cell separate from the electrode stack. Cells constructed in this manner operate over a pressure range or approximately 15–30 psia at room temperature, exhibit a maximum operating pressure of approximately 30 to 45 psia, and therefore simplify the design of the pressure vessel. In addition the safety of the fuel cell is greatly increased since the hydrogen is stored as a reduced compound rather than as a gas.

DETAILED DESCRIPTION OF THE INVENTION

Figure 1:
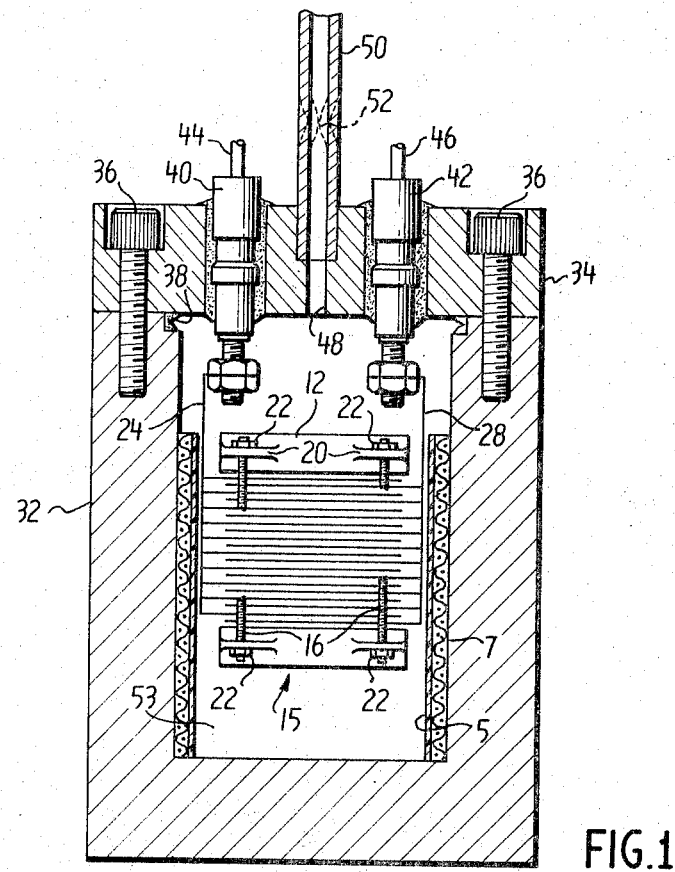
Figure 2:
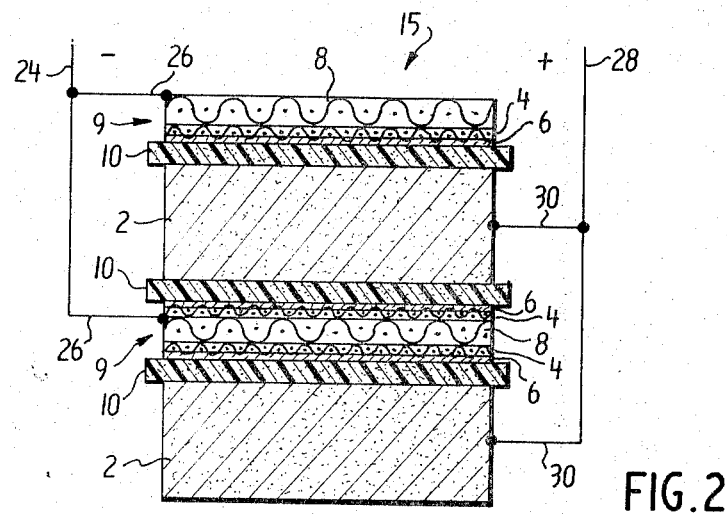

Referring now to FIGS. 1 and 2, the preferred embodiment of the invention comprises a plurality of positive electrodes 2 which are in the form of flat, porous, sintered nickel plaques impregnated with $Ni(OH)_2$, and a plurality of negative electrodes 9 which comprise at least one layer of a catalyst such as platinum or palladium that is capable of dissociating molecular hydrogen into monatomic hydrogen. The negative electrodes are conventional catalytic fuel cell electrodes and thus in the illustrated embodiment each negative electrode comprises two relatively thin nickel screens 4 coated on one side with a layer, 6 consisting of platinum intermixed with and bonded by Teflon or other suitable hydrophobic plastic matrix material. Each negative electrode comprises a relatively coarse nickel screen support 8 that is substantially thicker than the screens 6. The screen support 8 is positioned between and engages the uncoated sides of screens 6.

A lanthinum nickel hydride that is hydrogen absorbent and desorbent is stored within the container but separate from the electrode plate stack. One possible configuration as shown in FIG. 2 is to position the lanthinum nickel hydride in a teflonated nickel screen support structure 7 on the walls of the pressure container. After placement of the hydride, the nickel screen 7 is coated with a Teflon bond 5 to form a hydrophobic surface allowing hydrogen gas passage and inhibiting water vapor or KOH from reaching the lanthinum nickel hydride.

This assembled stack is mounted in a nickel casing 32 that is formed with one open end. The latter is closed off by a nickel end cap 34 which is secured in place in any conventional manner that provides a hermetic seal. In this case the end cap is secured in place by means of screws 36 that are screwed into tapped holes in the casing and a ring seal 38 which is compressed by the end cap in a groove formed in the casing so as to provide assurance against gas leakage. Mounted in openings in the end cap are two electric terminal assemblies comprising feedthrough insulators 40 and 42 formed around terminal leads 44 and 46 respectively. A preferred form of feedthrough insulator is shown in U.S. Pat. No. 3,109,055. The insulators are mounted and heremtically sealed to the end cap to prevent gas leakage. The straps 24 and 28 are attached to the inner ends of terminal leads 44 and 46 respectively as shown in FIG. 1.

The end cap also has a port 48 in which is mounted and hermetically sealed a nickel filling tube 50 which is permanently closed off by suitable means, e.g. by pinching the tube and welding it to itself as shown at 52, after chamber 53 of the casing is pressurized with hydrogen as hereinafter described.

The plaques which comprise the positive electrode are made by pressing nickel powder and a suitable binder, e.g. methylcellulose, into plate form and then sintering the pressed mixture to burn off the binder so as to render the plate porous. The sintering preferably is done in a hydrogen atmosphere at a suitable temperature, e.g. 900°C. These plaques are then impregnated with $Ni(OH)_2$. This may be done by immersing the plaques in an aqueous nickel nitrate solution, removing them from the solution, and then making the plaques cathodes in an aqueous KOH electrolyte whereby the nickel nitrate is cathodized to nickel hydroxide, $Ni(OH)_2$. Thereafter, the impregnated plaques are washed to remove any residual nitrate and the nickel hydroxide is oxidized to a trivalent state (NiOOH) by anodizing in an alkaline electrolyte, e.g. aqueous KOH. An alternative mode of impregnating the plaques consists of immersing the sintered plaques in a nickel nitrate solution, which contains 500 grams $Ni(NO_3)_2$ per liter of water, long enough to fill their pores, removing the plaques from the solution and drying them in air, and immersing them in a potassium hydroxide bath at 80°C so that the infiltrated $Ni(NO_3)_2$ reacts with the KOH to form $Ni(OH)_2$. Regardless of the procedure used to form the cathodes, it usually must be repeated a number of times to load the plaques with sufficient $Ni(OH)_2$ to provide a desired capacity. Once the plaques have been loaded with the desired amount of nickel hydroxide, they are oxidized (to the trivalent state) and reduced, i.e. charged and discharged, by anodizing and cathodizing in potassium hydroxide or other suitable alkaline elctrolyte. This charging-discharging procedure is preferably repeated at least three times to assure that all of the nickel hydroxide is activated, i.e. oxidized, and also to allow time for loose particles to fall off of the plates. Such loose particles are undesired in the assembled cell since they may cause short-circuiting.

In assembling the cell a quantity of the electrolyte, preferably a 20–35 percent water solution of potassium hydroxide, is placed in the casing prior to insertion of the cell stack and attachment of the end cap. The quantity of electrolyte placed in the cell is limited; preferably there is just enough electrolyte to wet the elctrolyte matrices, the nickel electrodes and the catalytic layers of the anode plates. However, a greater amount of electrolyte may be used, e.g. enough electrolyte may be used to leave a small residual pool thereof in the casing. In no event, however, should the amount of electrolyte be great enough to keep the cell stack immersed. With the electrolyte added, the cell stack 15 is inserted and the end cap is attached. It also is possible to add the electrolyte to the casing via the filling tube after the cell stack is inserted and the end cap secured in place. As an alternative procedure, it is possible to immerse the cell stack in the electrolyte outside of the casing long enough to get the desired degree of wetting and then to place the cell stack in the casing. Assuming that the electrolyte is added directly to the casing, the end cap is secured in place, the filling tube is blocked off and the casing is turned upside down and rotated or tilted so that the electrolyte will contact and wet the plates of the cell stack to the degree required. Once this is done, the casing is filled with hydrogen.

During the filling of the casing with hydrogen the lanthium nickel will absorb the hydrogen forming lanthium nickel hydride. The cell is then charged and the excess hydrogen is vented through the filling tube, so that the maximum hydrogen pressure in the cell is controlled to the desired maximum operating pressure, for example 2 atmospheres of pressure. The cell is then cycled several times to insure proper operation and then the filling tube is permanently closed off.

Operation of the cell of FIGS. 1 and 2 will now be described. Assume that the cell has been fully charged, and that it is connected for discharge through an exterior circuit. The cell pressure tends to decrease during discharge, and the lanthium nickel hydride will decompose into the lanthium nickel metal phase and hydrogen gas. The reaction taking place in the plateau region of the pressure decomposition isotherm of FIG. 4 is represented as follows:

$$La\,Ni_5H_6 \rightarrow LaNi_5\,H{\sim}_{0.4} + {\sim}2.8\,H_2$$

Figure 4:
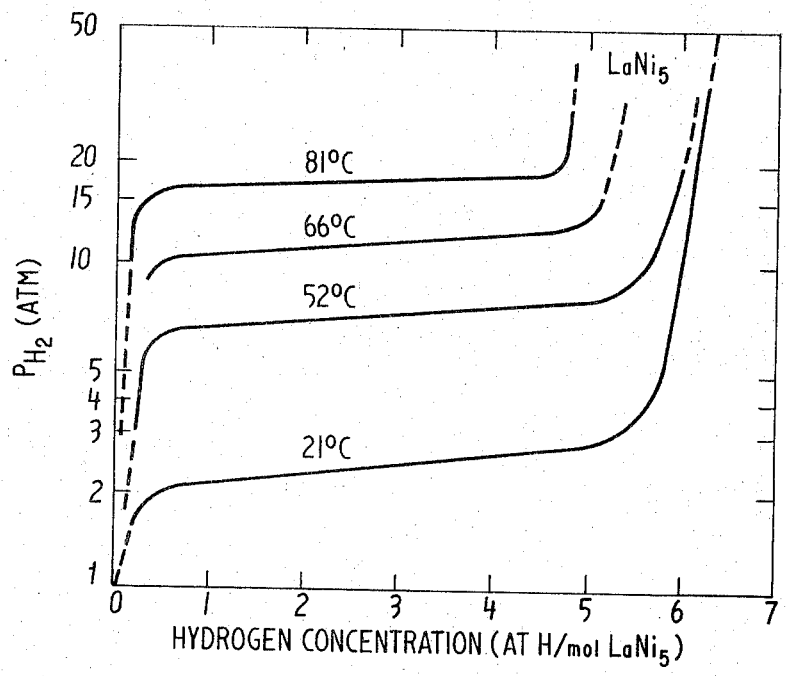

The actual operating pressure within the cell will change with temperature in accordance with the isotherms shown in FIG. 4. The hydrogen gas upon arriving at the catalyst surfaces of the negative plates becomes dissociated by the catalyst to the monatomic form. The decomposition rate for $LaNi_5H{\sim}_6$ is such as not to inhibit the cell reaction. The monatomic hydrogen is ionized and combines with hydroxyl ions to form water with an electron being released in the process of forming each hydrogen ion. The reactions at the negative electrode are as follows:

$$H_2 \rightarrow 2H \quad (1)$$

$$2H \rightarrow 2H^+ + 2e \quad (2)$$

$$2H^+ + 2OH^- \rightarrow 2H_2O \quad (3)$$

The net reaction at the negative electrode during discharge is:

$$\tfrac{1}{2}\,H_2 + OH^- \rightarrow H_2O + 2e \quad (4)$$

Hydroxyl ions are formed at the positive electrode by reaction of water with the available oxygen component of the nickel hydroxide. The representative reaction at the positive electrode during discharge is as follows:

$$NiOOH + H_2O + e \rightarrow Ni(OH)_2 + OH^- \quad (5)$$

As a result of these reactions, an electrode current is produced in the exterior circuit and the total cell reaction is as follows:

$$NiOOH + \tfrac{1}{2} H_2 \rightarrow Ni(OH)_2 \quad (6)$$

On recharging, the reaction (6) is reversed. The recharging mode is characterized by the regeneration of hydrogen gas at the negative electrode and the reoxidation of the nickel hydroxide at the positive plate. The hydrogen gas generated on recharging is absorbed by the lanthium nickel to form lanthinum nickel hydride.

A cell constructed in accordance with the teaching of this invention has inherent or built-in protection against overcharging or overdischarging. This built-in protection is facilitated by the fact that a sufficient amount of the lanthium nickel hydride is present so that the compound is never completely decomposed to the metallic phase of lanthium nickel when the positive electrode is completely discharged and also by the fact that the electrodes are not immersed in the electrolyte. Using a limited amount of electrolyte facilitates diffusion of hydrogen and oxygen for reaction as herein described.

The protection against overcharging and overdischarging will now be described. Consider first the case of charging the cell. On charging the $Ni(OH)_2$ is oxidized to $NiOOH$. During the charging cycle, the positive electrode reaches an endpoint corresponding to completion of the following reaction:

$$Ni(OH)_2 + OH^- \rightarrow NiOOH + H_2O + e \quad (7)$$

The negative electrode, on the other hand, has no such endpoint since it simply continues to consume water according to the following reaction:

$$H_2O + e \rightarrow \tfrac{1}{2}H_2 + OH^- \quad (8)$$

Thus as the positive plates approach the fully oxidized (charged) state, oxygen and water begin to be produced at the positive electrode according to the following reaction:

$$2 OH^- \rightarrow \tfrac{1}{2}O_2 + H_2O + 2e \quad (9)$$

However, at the same time hydrogen is also being evolved at the negative electrode according to reaction (8). In the presence of the catalyst surface and the large amount of hydrogen, the oxygen evolved at the positive electrode reacts to produce water according to the following reaction:

$$H_2 + \tfrac{1}{2}O_2 \rightarrow H_2O \quad (10)$$

or it may be reduced directly at the negative electrode according to reaction (11) which is the reverse of reaction (9):

$$\tfrac{1}{2}O_2 + H_2O + 2e \rightarrow 2OH^- \quad (11)$$

It is not known (nor believed to be material) which of the above recombination reactions occur, or if both occur, which one predominates. In any event, any oxygen that is released as a result of overcharging the positive electrode is consumed by reaction within the cell, and thus the cell is protected against overcharging. It is to be noted that with both recombination processes, the same quantity of current is passed, resulting in the conversion of energy (equivalent to the difference in potential between both electrodes) to heat with no net mass change.

Consider now the case of discharging the cell. On discharging the cell, the positive electrode material is reduced to $Ni(OH)_2$ and hydrogen gas released by the desorbtion of the lanthium Nickel hydride in the cell is consumed. If the cell is part of a large array of cells, e.g. a group of series-connected units of the type shown in FIG. 1, cell reversal (or overdischarge) can occur as current continues to flow through the discharged cell. In this case, as the positive electrode plates approach the full discharge condition, hydrogen gas begins to be evolved at the positive plates by reaction of water according to the reaction (8) above (it is to be noted that the reduction of $Ni(OH)_2$ to nickel is quite slow). At the same time hydrogen oxidation occurs at the negative electrode according to reaction (4) above since enough hydrogen is present in the hydride to minimize serious hydrogen depletion at the negative electrodes. As a consequence, overdischarging produces no deleterious effect on the electrodes. A unique feature of this overdischarge protection is that it allows the cell to be reversed with very little heat generation.

An advantage of this invention is that the maximum operating pressure of the container can be kept low, 30 to 45 psia. As noted above, the $LaNi_5$ will absorb hydrogen as the pressure tends to increase and thereby maintain the cell pressure in accordance with the plateau region of the isotherm as shown in FIG. 4.

Figure 3:
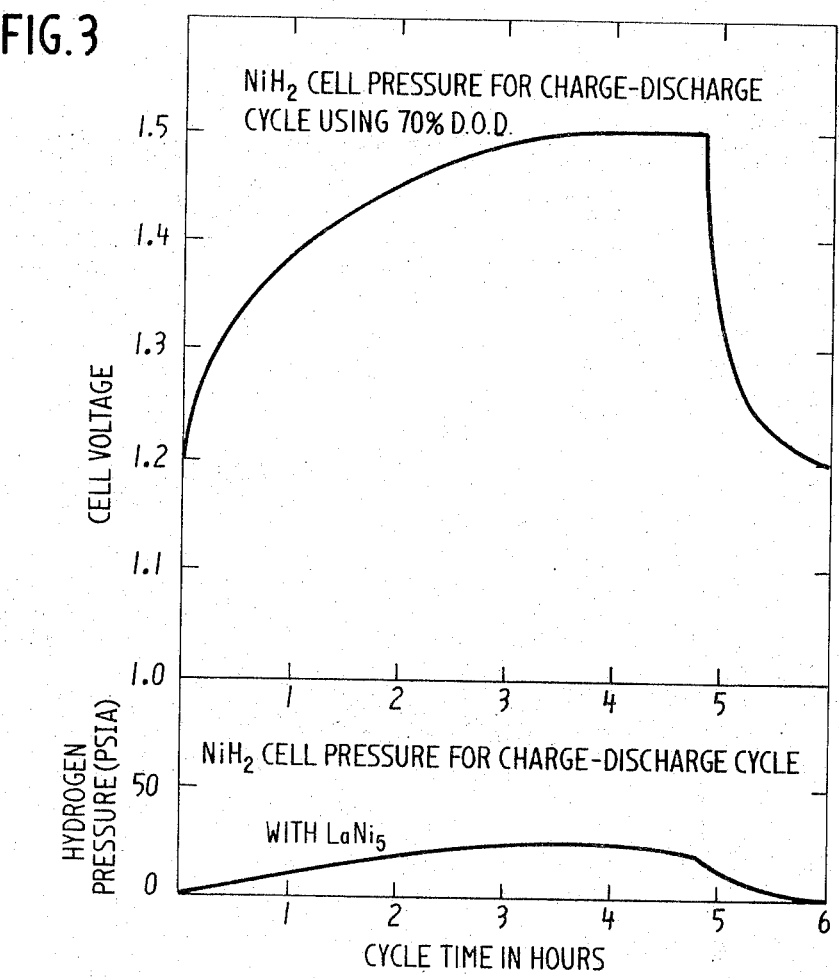

FIG. 3 illustrates the typical relationship of cell gas pressure to cell voltage for a cell constructed according to the teachings of this invention. Curve A depicts the changes in gas pressure and Curve B depicts the changes in cell voltage for a typical cell testing cycle. In this figure, the gas pressure is in atmospheres; the cell voltage is in volts; and the time is in hours. The cell would be pressurized with hydrogen to approximately 30 psia with the positive electrode in the discharged state, $Ni(OH)_2$. As the cell is charged the hydrogen is vented through the fill tube to two atmospheres of pressure in the cell. The pressure is decreased on discharge with a resulting decomposition of the hydride. The heat of decomposition of $LaNi_5H_6$ is 7.2K cal/mole of $H_2$. This cooling effect accounts for part of the pressure decrease during discharge. Upon complete discharge there is a decrease in pressure of approximately 15 psia. Without the hydride compound the pressure changes for the free volume of this cell would have been four to five times greater.

Cells made in accordance with this invention offer certain specific advantages over nickel-cadmium cells. In a Ni/Cd cell true overdischarge protection can be achieved in theory only by using a Cd precharge and an anti-polar mass. Even then it is not reliable and considerable heat evolution is to be expected. The invention also offers advantages over $Cd/O_2$ and $H_2/O_2$ cells. With the latter cells overcharge protection is difficult because the positive and negative electrodes have to be separated by a gas impermeable separator. The latter also is required in a $Cd/O_2$ cell to avoid self discharge.

In the case of the $H_2/O_2$ cells, overdischarge protection requires a large water storage capacity to prevent drying of the electrolyte matrix and even under these conditions catastrophic pressure differentials can appear in an integral $H_2/O_2$ cell on overdischarge. In addition $H_2/O_2$ cells operate at a substantially larger pressure than the cells made in accordance with this invention.

As noted above, the negative or hydrogen electrode essentially comprises an electrocatalyst. The latter may be platinum or palladium, as previously noted, or one of the following: Raney nickel, rhodium, columbium, silver, gold, ruthenium, osmium, or iridium, or alloys or oxides thereof. However, certain of these may be less preferable than others with respect to electrochemical activity and resistance to corrosion in the cell environment. The metal blacks of Group VIII of Mendelyeev's Periodic Table are most suitable in a fuel cell electrode since they are available in a finely divided state as required to maximize the reactive electrode surface area. Platinum is the preferred catalyst.

The negative electrode may be constructed in accordance with known fuel cell electrode technology. However, regardless of its exact structure and configuration, the negative electrode must permit gas diffusion to the reactive catalyst and must be resistant to electrolyte flooding. For this reason, it is preferred to disperse the catalyst particles is a gas permeable matrix material that is hydrophobic. The matrix material also should be resistant to corrosion and provide sufficient binding action to hold the catalyst particles in place. By way of example but not limitation, the hydrophobic binder is a polymer material. Exemplary suitable materials are polytetrafluoroethylene, polytrifluorochloroethylene, polyvinyl fluoride, polyvinylidenefluoride, polytrifluoroethylene, polystyrene, polymethylmethacrylate, polymethacrylate, polyacrylonitrile, polyvinyl chloride, polyethylene, and copolymers thereof. Teflon is the preferred polymer. The ratio of polymer to catalytic metal is not critical. Preferably, however, the catalyst-polymer mixture comprises about 50–80 percent metal and 50–20 percent polymer on a weight basis. It is preferred that the thickness of the catalyst-polymer layer be in the order of 10 mils and that such layer have a pore size distribution in the range from about 0.01 to 100 microns. Although it is possible to fabricate electrodes consisting only of a continuous film of catalyst particles in a hydrophobic polymer matrix, it is preferred to utilize a porous conductive element such as screen 4 in the electrode structure to permit more effective current takeoff, improve the mechanical integrity of the electrode and facilitate gas diffusion to the catalyst surface. Of course, screen 6 could be replaced by a sintered placque or a metal felt or mesh or wool, e.g. nickel wool. Other possible variations in the structure and method of fabricating the anodes are obvious from the teachings presented in U.S. Pat. Nos. 3,444,004, 3,533,851, and 3,553,022, and the references cited in said patents. Another possibility is use of a dual porosity electrode such as a porour nickel sinter without a hydrophobic component. In this case the small pores are filled with electrolyte by capillarity and the large pores are empty (gas filled) if the electrolyte fill level has been carefully adjusted. The catalyst is placed preferentially in the small pores.

Of course, the electrodes and electrolyte matrices also may be constructed and arranged as concentric members or bent in a spiral fashion to provide a so-called "jelly roll" structure. These alternative arrangements are well known in the battery art.

One can also incorporate cobalt hydroxide in the active nickel oxide mass of the positive electrode to improve charge cycle life. Typically about 8 percent of the active mass will consist of cobalt hydroxide.

Although aqueous KOH is the preferred electrolyte, the KOH may be replaced by or mixed with other alkaline salts, e.g. sodium or lithium hydroxides or mixtures thereof.

While $LaNi_5$ has been shown as the preferred compound for hydrogen absorption other hexagonal intermetallic compounds of similar properties may also be used such as $NdCO_5$, $PrCO_5$, and $SmCO_5$. In addition, the hydrogen absorption properties of $LaNi_5$ may be increased by a partial substitution of Lanthium by Cerium. Thus, the alloy $Ce_{0.3}La_{0.7}Ni_5$ can absorb 7 hydrogen atoms per molecule.

$LaNi_5$ may be located at any suitable location within the cell so as to permit hydrogen absorption and desorption.

The preferred container material for this cell is stainless steel. To improve the energy density a light weight container could be used. Some possible case materials include: nickel, Inconel 625, electroformed nickel, berylium nickel, or a filament wound structure.

What is claimed is:

1. An improved rechargeable power cell of the type that comprises a hermetically sealed container, said container including therein positive electrode means comprising NiOOH in the charged state and $Ni(OH)_2$ in the discharged state, negative electrode means comprising a catalyst mounted on a conductive support, said catalyst being a material capable of dissociating molecular hydrogen to monatomic hydrogen, an alkaline electrolyte, electrolyte retaining means disposed between said positive electrode means and said negative electrode means and a supply of hydrogen wherein the improvement comprises:

a hexagonal rare-earth intermetallic hydride disposed within said container out of contact with said electrolyte, said intermetallic hydride being a material capable of absorbing and desorbing hydrogen in response to changes in pressure.

2. A cell as claimed in claim 1 further including support means lining the inner walls of said container and having said intermetallic hydride embedded therein.

3. A cell as claimed in claim 2 further including means for coating said support means and said intermetallic hydride to form a hydrogen permeable hydrophobic surface.

4. A cell as claimed in claim 3 wherein said support means comprises a nickel screen.

5. A cell as claimed in claim 1 wherein said intermetallic hydride comprises a composition of the formula $AB_5$ where A represents a rare earth metal and B represents a compound selected from the group of nickel and cobalt.

6. A cell as claimed in claim 5 wherein said intermetallic hydride comprises $LaNi_5$.

7. A cell as claimed in claim 5 wherein said intermetallic hydride comprises $Ce_{0.3}La_{0.7}Ni_5$.

* * * * *